United States Patent [19]

Pond et al.

[11] 4,227,807
[45] Oct. 14, 1980

[54] HOLOGRAPHIC ANGLE SENSOR

[75] Inventors: Charles R. Pond, Federal Way; Patrick D. Texeira, Renton, both of Wash.

[73] Assignee: The Boeing Company, Seattle, Wash.

[21] Appl. No.: 901,244

[22] Filed: Apr. 28, 1978

[51] Int. Cl.³ .......................... G01B 11/26; G01B 9/02
[52] U.S. Cl. ..................................... 356/152; 356/354; 356/363
[58] Field of Search ................. 356/110, 111, 152, 79, 356/99, 363, 354

[56] References Cited

U.S. PATENT DOCUMENTS

| | | | |
|---|---|---|---|
| 3,471,239 | 10/1969 | Woodson | 356/110 |
| 3,549,239 | 12/1970 | Brienza et al. | 356/111 |
| 3,796,494 | 3/1974 | Takabayashi | 356/110 |

FOREIGN PATENT DOCUMENTS

2624295  12/1977  Fed. Rep. of Germany ........... 356/111

*Primary Examiner*—S. C. Buczinski
*Attorney, Agent, or Firm*—Cole, Jensen & Puntigam

[57] ABSTRACT

A shearing interferometer which includes a laser source, a reflector structure and an interference detection system. The reflector structure is mounted on an object, the angle of which, relative to a reference line, is to be determined. The reflector structure includes a transmission hologram and a retroreflector, wherein the transmission hologram is so constructed and positioned relative to the retroreflector that two or more parallel beams of preselected separation (shear) are produced for each incident beam. The difference in optical path length of a given pair of the parallel beams will vary depending on the object angle, and hence, the interference effect of the given pair of parallel beams will also vary in accordance with object angle. The interference effect is summed at a detector, and then analyzed by a tracking circuit to determine object angle.

15 Claims, 11 Drawing Figures

HOLOGRAPHIC ANGLE SENSOR

BACKGROUND OF THE INVENTION

This invention relates generally to the art of remote angle measurement, especially to devices such as those used for measuring the pitch angle of a model plane in a wind tunnel. More specifically, the invention concerns holographic angle measurement devices.

The present invention was developed to accurately measure pitch angle of a model plane in a wind tunnel, although the invention is useful in other angle measurement applications as well. Generally, prior art devices for measuring pitch angle in wind tunnels have utilized indirect measurement techniques. For instance, one device uses a pendulum and accelerometer arrangement to measure the change in vertical angle of the model. From this measurement, the pitch angle of the model is then calculated.

In another device, the angle of the supporting rod for the model, which is called the sting, is measured with a geared potentiometer. The forces on the model which produce sting deflection are measured with a load cell. From these measurements, the pitch angle of the model is calculated.

In still another device, which is useful in wind tunnel arrangements in which models are mounted on pedestals which extend upward from the floor of the wind tunnel, a potentiometer is connected to the arm of the pedestal in such a manner that a change in angle of the arm results in a change in measured resistance of the potentiometer. The pitch angle is then calculated from the measured resistance.

In the past, the results produced by such devices have been sufficiently accurate to warrant their use. However, with increasing emphasis on maximum aircraft efficiency, requiring sophisticated design techniques and testing devices, greater accuracy than that provided by such prior art devices is now necessary.

Besides low accuracy, however, these devices have another significant disadvantage, in that their results are not dynamic, i.e. there is often considerable delay between initial data measurement and the actual results, since both the basic measurement and calculation steps require considerable time. In many cases, the angle being measured has changed substantially by the time the angle information is obtained from the device. Hence, the information is often out-of-date by the time it is obtained, and sometimes no longer useful.

It is a general object of the present invention to provide an angle measurement system which overcomes one or more of the disadvantages of the prior art discussed above.

It is another object of the present invention to provide a single angle measurement device which is capable of measuring the pitch, roll and/or yaw angles of a model in a wind tunnel.

It is a further object of the present invention to provide such an angle measurement device which is more accurate than those of the prior art.

It is yet another object of the present invention to provide such an angle measurement device which provides results in real time.

BRIEF DESCRIPTION OF DRAWINGS

Other objects of the present invention may become known when the description of the preferred embodiment is taken in conjunction with the following drawings, in which.

It is a still further object of the present invention to provide such an angle measurement device which is relatively insensitive to differences in the index of refraction of the air flow in a wind tunnel.

SUMMARY OF THE INVENTION

Accordingly, the present invention includes means for generating a partially coherent light beam, which is incident on a reflector means which is positioned on an object the angular orientation of which is to be measured. The reflector means includes means for producing at least two derivative beams having different optical path lengths, depending on the angular orientation of the object. The two derivative beams are characterized by a preselected separation or shear sufficiently small that the wavefronts of the two beams are substantially equally affected by changes in the index of refraction across the medium through which the two derivative beams are moving. The optical phase of the two beams will vary depending on the angular orientation of the object, and hence, the present invention also includes means for measuring the change in optical phase of the two beams. This value of phase change is a function of the angular orientation of the object and is hence correlatable to a corresponding value of object angle.

DESCRIPTION OF PREFERRED EMBODIMENT

Figures 1, 6, 7:
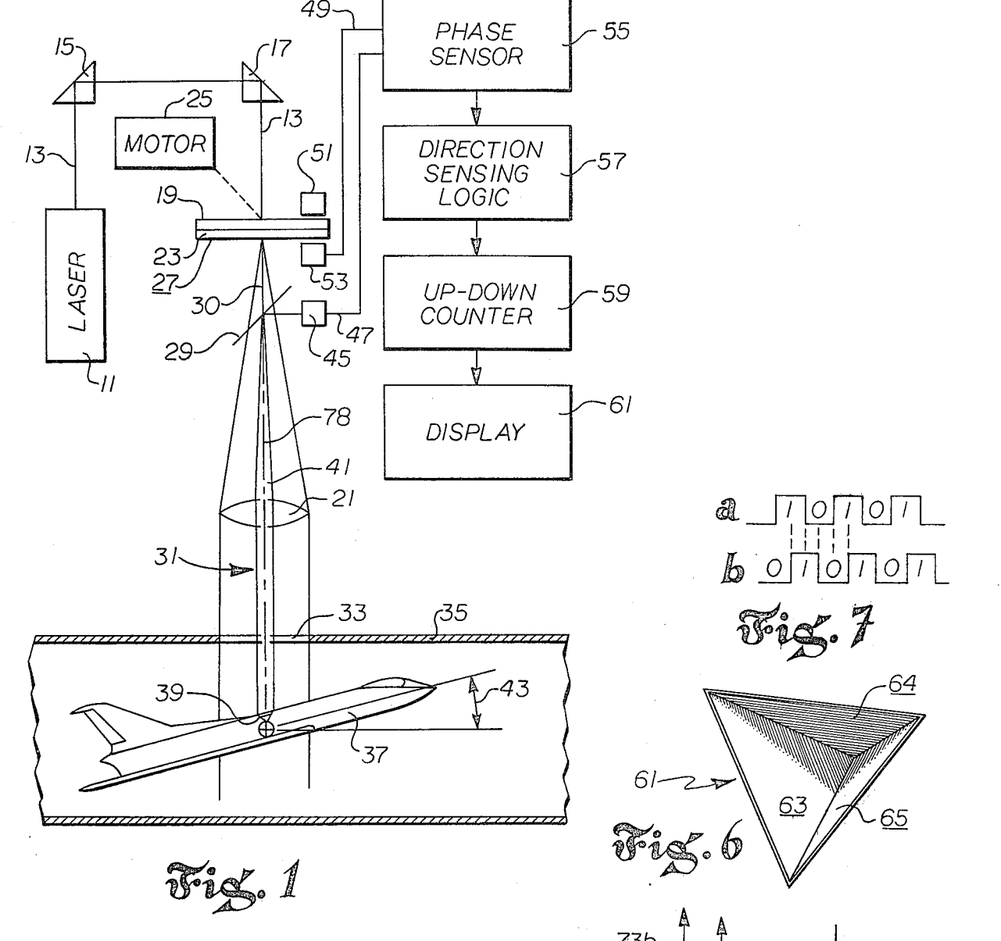
FIG. 1 is a simplified block diagram of applicant's invention, shown in a wind tunnel application.
FIG. 6 is an isometric view of a cube corner reflector, looking into the reflector.
FIG. 7 is a signal diagram showing the waveform inputs, for a constant rate of angle change of the reflector structure, to the tracking circuit of FIG. 5.

FIG. 1 is a generalized block diagram showing the system of the present invention used for measuring the pitch angle of a model in a wind tunnel. It should be understood, however, that the present invention is not limited to such a use, and that it can be effectively used in other applications.

Referring to FIG. 1, a coherent beam of light is produced by a conventional laser 11 which, for example, may be a helium-neon laser producing light having a wave length of 633 nanometers (nm). Other wavelengths may be successfully used as well. The light source need be only partially coherent to the extent necessary to measure the desired range of angles. For the purposes of this application, the term "partially coherent" means that the coherence length of the source must be at least as great as the optical path difference of the interfering beams summed at the detector of the apparatus due to the angle of the reflector structure on the object relative to an incident beam thereon, as is explained in detail in following paragraphs.

The laser beam 13 is reflected at 90° by prism reflectors 15 and 17 and directed to a diffuser 19. Diffuser 19 may be constructed of ground glass or it may be an array of very small lenses, i.e. 0.01 inches in diameter, so that it makes the beam 13 appear to originate from multiple point sources, spreading the beam 13 out so that it will fill collimating lens 21. Diffuser 19 is secured to one surface of a tracked reticle 23, which is shown in detail in FIG. 3.

Figure 3:
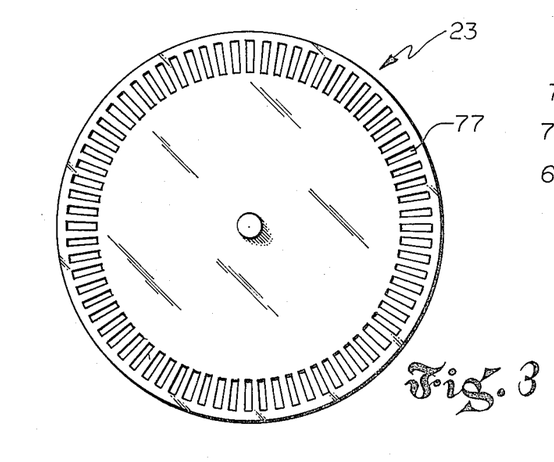
FIG. 3 is a front view of the tracked reticle used in the present invention.

The tracked reticle 23 in FIG. 3 is a disc approximately 2½ inches in diameter. The disc is transparent, with a plurality of bar-like opaque regions 77 arranged around its periphery. Each of the opaque regions is a radial bar which, if extended, would intersect the center of the disc. Hence, the opaque bars result in a track effect on the disc. Each of the opaque regions 77 in the disc of FIG. 3 is approximately ¼ inch long and approximately 1/16th inch wide. The spacing between the opaque regions will vary from apparatus to apparatus.

The laser beam 13 strikes the diffuser 19 at its top center. The diffuser 19 and tracked reticle 23 are rotated at a fixed angular velocity by motor 25, so that two or more sweeping beams 30 of linear spacing S will be produced adjacent surface 27 of reticle 23 as reticle 23 rotates. These beams pass through beam splitter 29 and are collimated by lens 21. Beams 31, referred to as the incident beam, emerging from lens 21, comprise two or more angularly swept beams with angle separation of S/f, where f is the focal length of lens 21.

The incident beam 31 emerging from lens 21 is then directed through a window 33 in one wall 35 of the wind tunnel, in which a model 37 is located.

The model 37 may be mounted in one of several conventional ways in the tunnel. Two of the most typical ways are (1) a vertical pedestal, which is mounted on the floor of the tunnel and on which rests the model, and (2) a thin, reed-like rod, referred to in the art as a sting, which extends substantially horizontally from a vertical mounting plate located downstream of the model in the wind tunnel. The model may be either a full model, or it may be what is referred to as a "half-model" which is one-half of a plane model, split along the longitudinal axis of the plane.

Located on some predetermined part of the model, for instance, on the top of the body of the model, is a reflector structure shown generally in FIG. 1 as element 39. Reflector structure 39 comprises two elements and is an important part of the present invention. Reflector structure 39 will be explained in more detail in following paragraphs, with particular reference to FIG. 2. Initially though, it should be understood that the general characteristic of reflector structure 39 is that its reflection coefficient, or the ratio of reflected light to incident light, will vary with the angle of incidence of the incident beams in an approximately sinusoidal manner. The period of the angular variation matches the angular spacing of the incident beam 31 energing from lens 21.

Reflector structure 39 thus produces a time-varying modulation of incident beam 31 from lens 21 at the speed of rotation, i.e. frequency, of the tracked reticle. Also, an interference phenomena occurs in the reflector structure which is dependent on the angle of the object on which the reflector structure is located. Multiple beams are reflected from reflector structure 39, but a parallel set of beams 41 are produced which are directed back through window 33 parallel to the incident beam 31. The optical phase of the return beams will vary depending upon the object angle, and hence, the change in optical phase of the return beams may be measured to determine the object angle.

In one embodiment, involving an AC fringe counting system, the return beams 41 pass through collimating lens 21, reflect off beam splitter 29 and are directed to a conventional light detector 45, where their interference effect is summed.

An AC signal is produced on line 47 at the output of light detector 45, the phase of which AC signal is dependent upon the interference between the two beams 41 and hence the angle of the object. Referring to FIG. 1, the signal on line 47, hereinafter referred to as the data signal, will thus vary in phase in accordance with a change in angle 43, referred to as pitch angle. The term "pitch angle" may refer, in a wind tunnel application, either to the angle between the wing and the flow direction, or the body and the flow direction. For the purposes of this application, the term pitch angle refers to the angle between the body of the model and the flow direction, i.e. a horizontal reference. This is shown as angle 43 in FIG. 1.

The phase of the data signal is compared with the phase of a reference AC signal produced on line 49 by a combination of a fixed light source 51 and a light detector 53, which are positioned on opposite sides of the combination of diffuser 19 and tracked reticle 23, as shown in FIG. 1.

The data and reference signals are then applied to a tracking circuit comprising a number of conventional elements. First, the phase of the data and reference signals is recognized by phase sensor circuit 55. The direction of change of the changing phase of the data signal relative to the fixed phase of the reference signal is then detected by direction sensing logic circuit 57. An up/down counter 59 accumulates the phase changes, with each count representing a particular angular value of phase, relative to a reference angular position of the reflector structure. This information in up/down counter 59, which is representative of the angle of the object, is then either displayed directly on display 61 or converted to the value of the corresponding pitch angle. Angular rate of change may also be determined.

Figure 2:
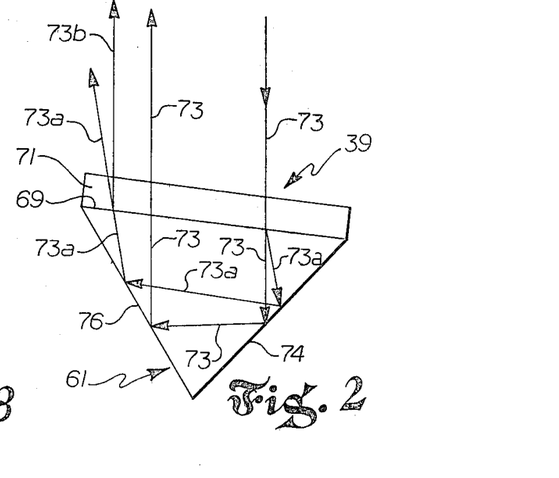
FIG. 2 is a diagram showing pictorially the reflector structure of the present invention and its operation relative to a zero order incident beam.

Referring now to FIGS. 2 and 6, the reflector structure shown generally at 39 in FIG. 1 is shown in more detail. It comprises a retroreflector 61, and a transmission hologram 71. In the embodiment shown, retroreflector 61 is a cube corner reflector, which is, as the name implies, a corner of a cube. Cube corner reflector 61, as shown more clearly in FIG. 6, has three flat reflecting interior faces 63, 64 and 65, terminating in a common plane at reflector front face 69. Cube corner reflectors are well known to those skilled in the art. The primary functional characteristic of a cube corner reflector is that a beam of light entering the cube corner reflector will be reflected off all three reflecting interior faces 63, 64 and 65 before exiting parallel to its direction of entering.

Positioned against the front face 69 of the cube corner reflector 61 is hologram 71. Hologram 71 is a thin hologram of two collimated beams intersecting at a particular angle. The hologram is a one axis series of light and dark bars, like a linear diffraction grating. In the place of the hologram, a diffraction grating could be used. When the hologram is illuminated by a single incident beam, a pair of reconstructed beams result.

The combination of the hologram and the cube corner reflector acts as a wavefront shearing interferometer, producing, among others, two parallel reconstructed beams which have different optical path lengths due to the angle of the reflector structure relative to the incident beam. The interference between the two beams, which is dependent on the difference in optical path length may then be summed and tracked to determine the angle of the object.

Moreover, the two parallel beams are sufficiently close together to avoid distortion in their interference due to changes in the index of refraction across the gas flow in a wind tunnel.

It is possible to construct a wavefront shearing interferometer for wind tunnel use which incorporates two small cube corner reflectors, but even using the smallest practical cube corner reflectors, the resulting sheared beams are not sufficiently close together to avoid random phase changes across the wavefronts of the beams, which seriously affect the accuracy of the results of the device.

The difference in index of refraction across the gas flow, caused by temperature difference, composition variation, and turbulence, is sufficiently great between the two beams produced by separate reflectors that distorted interference effects result. The amount of distortion will depend upon the amount of difference in the index of refraction of the gas flow between the two beams. In many cases, the difference is sufficient that accurate results from the resulting distorted interference effects are impossible to obtain.

With the hologram, only one reflector is needed, as a pair of parallel reconstructed beams can be produced with a sufficiently narrow shear that changes in the index of refraction across the flow do not affect their interference. The amount of the shear, as well as the angular resolution of the apparatus, can be controlled by changing the angle of the collimated beams used to construct the hologram. In FIG. 2, a single incident beam 73, such as beam 31 from collimating lens 21, is directed toward the reflector structure 39. The beam 73 proceeds through hologram 71 before entering retroreflector 61, which is a cube corner reflector in the embodiment shown.

The rear face of hologram 71 mates with front face 69 of the cube corner reflector. An incident beam on hologram 71 will result in reconstructed beams of preselected angle relative to the incident beam, as explained above. In FIG. 2, the incident beam 73, referred to as the zero order beam, travels through the hologram producing a first order beam 73a. Both the zero order beam 73 and the first order beam 73a reflect off the three interior surfaces of the cube corner reflector and are then directed back through the hologram 71.

At the hologram, each beam will again produce two additional reconstructed beams, at the same preselected angles. For purposes of illustration, however, only one additional beam 73b is shown, which is another zero order beam, produced by first order beam 73a. Beam 73b is parallel to beam 73 and they remain parallel as they proceed back to lens 21 (FIG. 1).

The separation distance between beams 73 and 73b is very small, so that the change in index of refraction across the flow between the wavefronts of the two beams will be so small that the interference effect between the two beams, which is dependent on the angle of the object, is negligably affected, even though there may be a substantial amount of turbulence and nonuniformity in the flow.

Figures 4A, 8:
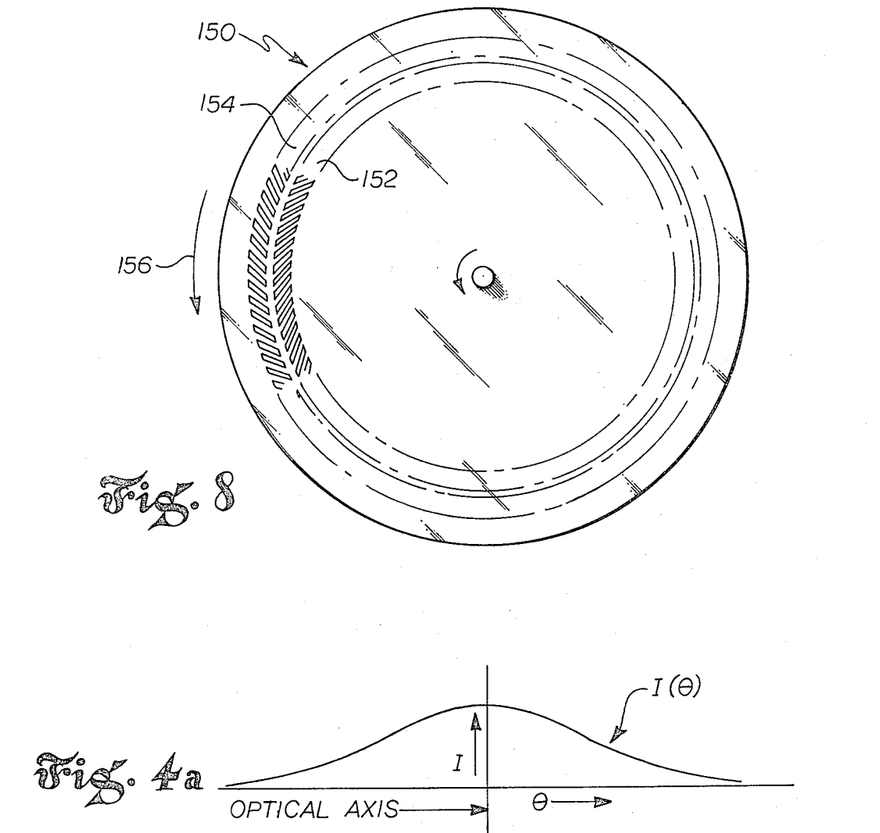
FIG. 8 is a front view of another reticle which can be used to measure two-axis angular change.

FIG. 4 shows waveforms which illustrate the operation of the device. FIG. 4a is a plot of the intensity of the light at the prism side of tracked reticle 23 versus position, i.e. angle $\theta$, from the optical axis, which is the center of collimating lens 21. The optical axis of the system is shown as dashed line 78 in FIG. 1. Light presented to the tracked reticle 23 along the optical axis will be of maximum intensity, while light present at successively greater angles from either side of the optical axis is successively less intense.

Figure 4B:
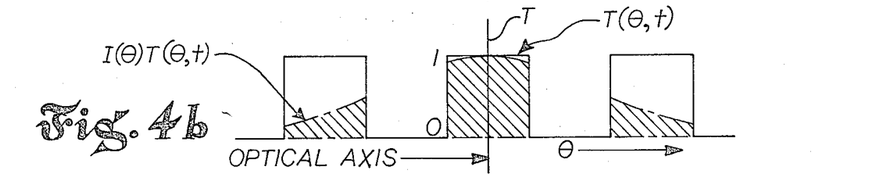
FIG. 4 is a signal diagram showing, in (a) the intensity distribution of the light on the prism side of the reticle, (b) the modulation effect of the reticle and (c) the transfer function of the reflector structure.

The light transfer function $T(\theta,t)$ of the tracked reticle 23 is shown in FIG. 4b, which is a square wave plot of light transmission through reticle 23 as a function of angle $\theta$ for one instant in time. Since the reticle is being rotated, the beams are thus "sweeping", so that the transmission of light is dependent on the angle of the light from the optical axis as well as time. At any one instant in time, the light will either pass through the reticle, or it will be blocked, and hence, the transfer function of the reticle is in the form of a square wave. The functions $I(\theta)$ and $T(\theta,t)$ are shown combined in the shaded area of FIG. 4b. At the one instant in time for the reticle transfer function shown in FIG. 4b, the light presented to the reticle in the form shown in FIG. 4a will be passed at certain angles by the reticle and will be blocked at other angles, resulting in a light intensity distribution for that one instant in time shown by the shaded area of FIG. 4b. If the combined transfer function is further taken over time, the shaded area of FIG. 4b would be continuous.

Figure 4C:
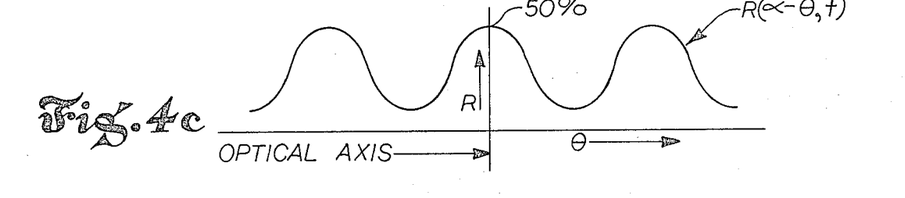

FIG. 4c is a waveform illustrating the change in reflection coefficient R for the reflector structure 39 relative to angle $\theta$ of the light reaching the reflector structure. The value of the reflection coefficient of reflector structure 39 depends on the angle of incidence of beam 73, which depends both on angle $\theta$ of the incident beam, and the pitch angle of the object. Hence, the curve of FIG. 4c is for a particular pitch angle; the phase of the curve will change with pitch angle. The reflection of the reflector structure 39 is maximum (approximately 50%) when the angle of incidence of the incident beam 73 is such that the wavefronts of reconstructed beams 73 and 73b are in phase and is minimum (approximately 10%) when the angle of incidence of the incident beam 73 is such that the wavefronts of beams 73 and 73b are out-of-phase. The angle between successive reflection maxima is $\lambda/d$, where $\lambda$ is the wavelength of the light emitted by laser 11, and d is the displacement between beams 73 and 73b. Since the multiple angular beams produced by reticle 23 and lens 21 have an angular separation of S/f, the hologram 71 is fabricated so that $\lambda/d = S/f$.

When the transfer functions of each waveform are combined and integrated over $\theta$, which is expressed as follows:

$$K \int_\theta I(\theta)T(\theta,t)R(\alpha - \theta,t)d\theta,$$

the result is the mathematical expression for the temporal dependence of the light which is summed at detector 45. The constant K is the optical efficiency of the apparatus, and $\alpha$ is the pitch angle.

The parallel reconstructed beams 41 from the reflector structure 39 are summed at detector 45, which is a conventional light detector, and which produces an electricl signal corresponding to the intensity of light detected. This signal is in the form of a sine wave of substantially stable peak amplitude. This is the data signal which appears on line 47 in FIG. 1.

In operation of the device, a change in a pitch angle will, as noted above, cause a change in the phase of the transfer function curve of the reflector structure, causing a change in the phase of the data signal from detector 45. Hence, a given change in the phase of the data signal on line 47 can be directly correlated with a change in angle of the object such as the pitch angle of the model in a wind tunnel.

The reference signal on line 49 is, as briefly explained above, produced by the combination of light source 51, detector 53, and a small fixed portion of another reticle (not shown), referred to as a mask. Light source 51 and detector 53 are located on opposite sides of the diffuser-reticle combination, while the mask is located between reticle 23 and detector 53.

Light source 51 may be, for instance, a small incandescent bulb, 2-5 volts, while the mask is a portion of a reticle identical to reticle 23. The mask is usually mounted quite close to, and often directly on, the detector 53. The light produced by source 51 casts a shadow of the moving track of reticle 23 onto the mask. The resulting output from detector 53 is an alternating voltage with a fixed phase. This signal is referred to as the reference signal and appears on line 49.

Figure 5:
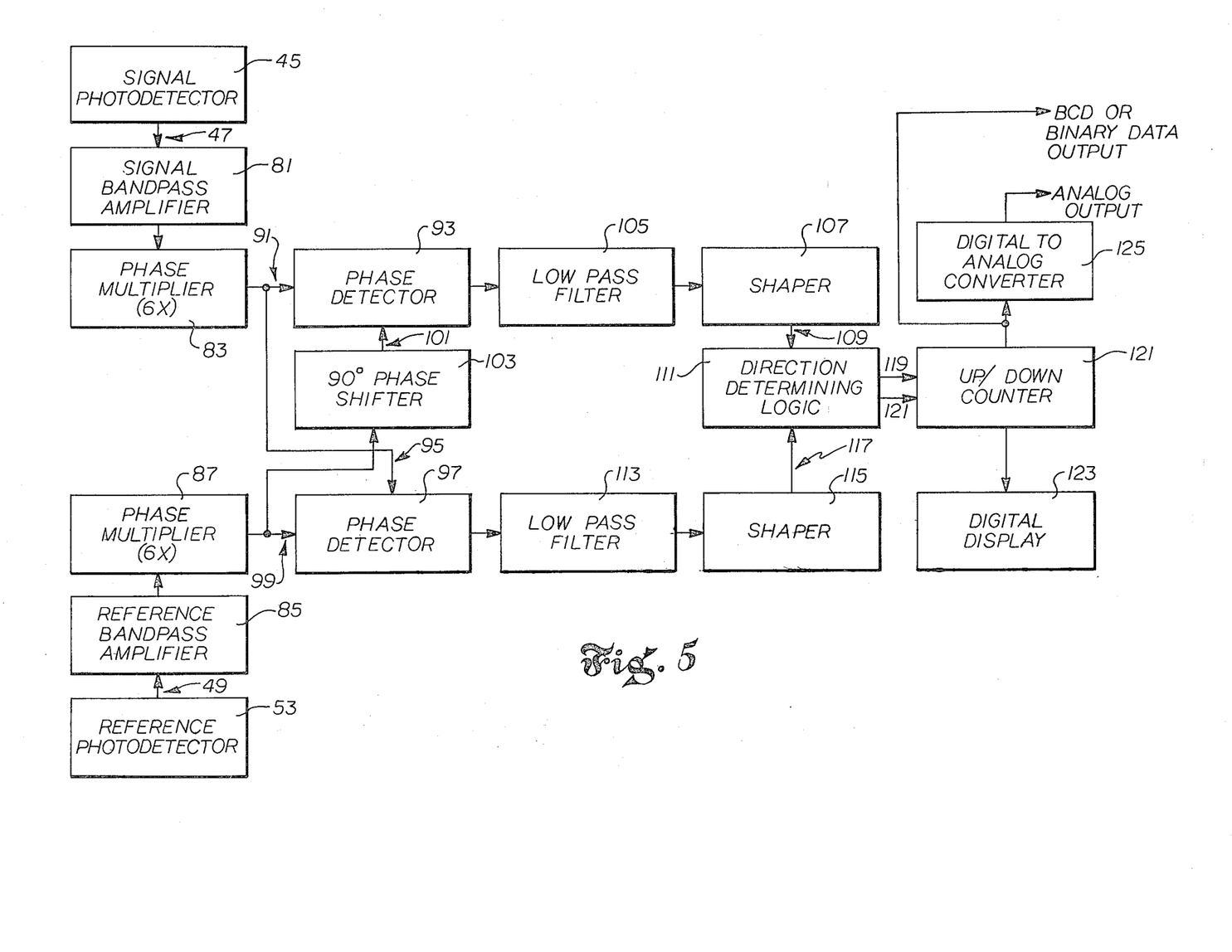
FIG. 5 is a block diagram of the tracking circuit portion of the present invention which produces the value of the measured angle.

The data and reference signals, on lines 47 and 49, respectively, are then applied to the tracking circuitry, which is shown in more detail in FIG. 5. The data signal on line 47, from signal photodetector 45, is applied to a bandpass amplifier 81 and then a phase multiplier 83, while the reference signal on line 49 from reference photodetector 53 is applied first to a bandpass amplifier 85 and then a phase multiplier 87. The phase multiplication in the embodiment shown is by a factor of six, which improves resolution substantially, without harming or distorting the phase information.

The resulting signal from the signal phase multiplier 83 is then applied to one input 91 of phase detector 93, and also to one input 95 of a second phase detector 97. The signal from the reference phase multiplier 87 is applied at another input 99 of phase detector 97 and also to another input 101 of phase detector 93, through a 90° phase shifter 103.

The output of phase detectors 93 and 97 represent the instantaneous phase difference between the two applied waveforms. The outputs from phase detectors 93 and 97 are in phase quadrature since the phase of the input signals are also in phase quadrature. It is necessary that these signals be in phase quadrature, since the direction of phase change of the data signal has to be determined.

The output from phase detector 93 is then applied through a conventional low pass filter 105 and then to a shaper 107 to one input 109 of a conventional direction determining logic circuit 111. The output of phase detector 97, on the other hand, is applied through a low pass filter 113 and a shaper circuit 115 to another input 117 of direction determining logic 111.

The waveforms at inputs 109 and 117 are digital. Illustrative waveforms for the input signals to the direction determining logic circuit 111 are shown in FIG. 7. For purposes of explanation, waveform a is the waveform at input 109, while waveform b is the waveform at input 117.

These two waveforms represent binary levels of the quadrature signals for particular phase relationships between the data signal and the reference signal. As long as the phase difference between the data signal and the reference signal is constant, the signals at inputs 109 and 117 are at fixed logic levels, 1 or 0.

For purposes of explanation, assume that the system is arranged so that an increase in the pitch angle will result in level changes to the right while a decrease in the pitch angle will result in level changes to the left. The transition in levels occur at phase difference intervals of $\pi/2$ between the multiplied data signal and the multiplied reference signal.

Direction determining logic circuit 111 determines the direction of phase change between the multiplied data signal and the multiplied reference signal. Referring to FIG. 7, assume that the initial phase relationship between the quadrature signals at inputs 109 and 117 is such that the voltage levels of both signals are 0. If the pitch angle increases, the next logic states for the two signals, representing an increase of $\pi/2$ radians of the multiplied data signal, would be a 1 for the signal input at 109 and a 0 for the signal at input 117. If the pitch angle decreases, the next logic states for the two signals, representing a decrease of $\pi/2$ radians of the multiplied data signal, would be a 0 for the signal at input 109 and a 1 for the signal at input 117.

Thus the logic states of the quadrature signals provide information for determining the direction of phase change between the data signal and the reference signal, which is representative of pitch angle. Four different possible logic state relationships exist between the quadrature signals at inputs 109 and 117. These logic states change in a repeatable sequence. In the direction determining logic, a comparison is made at intervals representing a change in $\pi/2$ radians of the multiplied data signal between the new logic state relationship and the previous logic state relationship.

Logic circuit 111 makes a determination after each comparison concerning whether the angle is increasing or decreasing. If increasing, a pulse is provided on line 119 for each $\pi/2$ phase change in the data signal, while if the angle is decreasing, a pulse is provided on line 121 for each $\pi/2$ phase change in the data signal. Since the phase of the data signal and the reference signal are both multiplied by six in phase multipliers 83 and 87, each pulse applied to counter 121 represents a phase change for the data signal of $\pi/12$ radians or 15 degrees relative to the reference signal.

The output of the up/down counter 121 may then be applied either to a digital display device 123, which will display the digital counts, or it may be applied to a D/A converter 125, which converts the count information into an analog value. The BCD or the binary data from counter 121 may also be provided, as shown in FIG. 5.

Hence, an apparatus has been described and shown which is capable of producing accurate measurements of angle in a dynamic mode. It is particularly useful in a wind tunnel application but can be successfully used in other applications.

Additionally, it should be understood that the present invention, with some modifications and/or additions, can be even more useful. Both the roll angle and yaw angle of the model, in addition to the pitch angle, can be measured with some modification of the basic structure of FIG. 1.

One way to provide roll angle data involves modification of the tracked reticle 23 as shown in FIG. 8. In the tracked reticle 150 of FIG. 8, two concentric sets of tracks 152 and 154 are provided, separated radially from each other by a relatively small distance. The tracks in each set are orthogonal to each other and at 45° to the instantaneous direction of rotation of the reticle, shown by numeral 156 in FIG. 8. The reticle 150 in operation will produce two othorgonal sets of sweeping beams, one for measurement of pitch angle, and the other for roll angle. Hologram 71 would be manufactured with orthogonal sets of light and dark bars, to produce the two resulting beams at specified angles from the incident beam, for each incident beam, so that it functions as a two axis grating. An additional light detector and an additional package of processing electronics would be required.

As noted above, referring to FIG. 2, zero order beams 73 and 73b were used in the determination of pitch angle. First order beams are also returned, and these can be used to measure yaw. The first order beams return through lens 21 and are focused a specified distance off the optical axis at points referred to as focal spots. These focal spots of the first order beams rotate around the optical axis, i.e. the focal spot of the returning pair of zero order beams, as the model in the wind tunnel yaws. A conventional position sensing detector, such as the "spot continuous" detector manufactured by United Detector Technology, Inc. may be used to measure the rotational motion of the focal spots. This angular rotation can then be correlated to a corresponding yaw angle.

Although a preferred embodiment of the present invention and some variations thereof have been disclosed, it should be understood that additional changes and alterations to the embodiment shown can be accomplished, without altering the spirit of the invention, which is defined by the claims which follow.

What is claimed is:

1. An apparatus for determining the angular orientation of an object, comprising:
   (a) means for generating a partially coherent light beam;
   (b) reflector means positioned on said object, said reflector means including means for producing at least two derivative beams from an incident beam, said beam producing means being positioned relative to said reflector means such that a light beam passes through said beam producing means upon entry and exit from said reflector means, wherein said beam producing means produces two original derivative beams from an incident beam entering said reflector means in such a manner that said two original beams travel paths of different length within the reflector means between entry and exit thereof, the difference in path length between said two original beams being representative of the angular orientation of the object, and wherein said beam producing means produces at least two additional divergent beams from each of said two original beams upon exit of the original beams from said reflector, at least one additional beam produced from one of the original beams being parallel to one additional beam produced from the other of the original beams, said two parallel beams being characterized by a separation sufficiently small that the wavefronts thereof are substantially equally affected by changes in the index of refraction across the medium through which said two parallel means are moving; and
   (c) means for measuring the change in optical phase of said two parallel beams, which value of phase change is a function of the angular orientation of the object and hence is correlatable to a corresponding value of the angular orientation of the object.

2. An apparatus of claim 1, wherein said measuring means includes: means for summing said two derivative beams to produce a data signal, the phase of which is dependent on the angular orientation of the object, means developing a reference signal having a constant phase, and means determining the phase difference between said data signal and said reference signal at successive time intervals, which phase difference is correlatable to the value of the angular orientation of the object.

3. An apparatus of claim 1, wherein said reflector means includes a retro-reflector and a transmission hologram positioned adjacent the front face of the retro-reflector, wherein said hologram is so constructed that two reconstructed beams emerge from the reflector means which are parallel to each other and are the same order beams.

4. An apparatus of claim 3, wherein the reflection coefficient of said reflector means varies, due to the varying interference of said two reconstructed beams, as the angular orientation of the object relative to the incident beam changes.

5. An apparatus of claim 2, wherein said light beam generating means further includes (a) a combination of a diffuser and a tracked reticle, which, when rotated, produces a set of sweeping beams when the partially coherent light beam is focused on the rear surface thereof, and (b) a collimating lens positioned so that its focal plane is at the front surface of the diffuser/tracked reticle combination, wherein the sweeping beams substantially fill the aperature of said collimating lens.

6. An apparatus of claim 5, wherein said reference signal developing means includes a light source positioned on one side of said tracked reticle, a light detector positioned on the other side of said diffuser/tracked reticle combination, and a mask, comprising a small additional section of a reticle, similar to said tracked reticle, positioned between said diffuser/tracked reticle combination and said light detector.

7. An apparatus of claim 2, wherein said determining means includes means producing a count each time the phase relationship between the data signal and the reference signal changes by a predetermined amount.

8. An apparatus of claim 7, wherein said determining means further includes means for adding said count to a previous total count if the phase relationship between the data signal and the reference signal is changing in one direction, and for subtracting said count from the previous total count if the phase relationship is changing in the other direction.

9. An apparatus of claim 8, wherein said determining means further includes (a) means for detecting the phase of said data signal and for detecting the phase of said reference signal, (b) means developing first and second square waves indicative, respectively, of the phase of said data and reference signals, wherein said first and second square waves are in phase quadrature, and (c) means for comparing the amplitudes of said first and second square waves at successive time intervals, so as to determine the relative movement, if any, of said first and second square waves, and hence the change in phase, if any, between said data signal and said reference signal.

10. An apparatus of claim 9, including means for multiplying, without distortion, the phase of said data and reference signals.

11. An apparatus of claim 1, wherein said light beam generating means includes means for generating first and second partially coherent light beams which in operation sweep orthogonially to each other as they impinge on said reflector means, said reflector means producing two sets of two parallel derivative beams, one set of derivative beams being subsequently used to determine object angle in a first axial direction and the other set being used to determine object angle in a second axial direction.

12. An apparatus of claim 11, wherein said light beam generating means includes a combination of a diffuser and a tracked reticle, wherein the tracked retcile includes two concentric rings of tracks, wherein the tracks in each ring are othogonal to each other, thereby producing said two sets of sweeping orthogonal beams when said tracked reticle is rotated.

13. An apparatus of claim 1, including means for tracking the rotation of selected beams produced by said reflector means which are of the same order amongst themselves, but a different order than said two derivative beams, to determine movement of the object in a third axial direction.

14. An apparatus of claim 1, wherein said reflector means is constructed such that the path of exit of a light beam from said reflector means is parallel to its path of entry.

15. An apparatus of claim 1, wherein the derivative beams produced by said beam producing means are divergent.

* * * * *

UNITED STATES PATENT AND TRADEMARK OFFICE
CERTIFICATE OF CORRECTION

PATENT NO. : 4,227,807
DATED : October 14, 1980
INVENTOR(S) : Pond et al

It is certified that error appears in the above-identified patent and that said Letters Patent are hereby corrected as shown below:

In Claim 1, at column 9, line 65, the word "means" should be --beams--.

In Claim 12, at column 11, line 16, the word "retcile" should be --reticle--.

Signed and Sealed this

Thirteenth Day of January 1981

[SEAL]

Attest:

SIDNEY A. DIAMOND

Attesting Officer

Commissioner of Patents and Trademarks